(12) United States Patent
Finger et al.

(10) Patent No.: US 9,536,078 B2
(45) Date of Patent: Jan. 3, 2017

(54) INTEGRATED CIRCUIT FOR CYBER SECURITY PROCESSING

(71) Applicant: Forcepoint Federal LLC, Herndon, VA (US)

(72) Inventors: Laurence B. Finger, Fort Wayne, IN (US); David E. Mussmann, Spencerville, IN (US); Jason M. Fannin, Fort Wayne, IN (US); Noel E. Johnson, Fort Wayne, IN (US); Allen M. Schwartz, Fort Wayne, IN (US)

(73) Assignee: Forcepoint Federal LLC, Herndon, VA (US)

( * ) Notice: Subject to any disclaimer, the term of this patent is extended or adjusted under 35 U.S.C. 154(b) by 373 days.

(21) Appl. No.: 13/649,261

(22) Filed: Oct. 11, 2012

(65) Prior Publication Data

US 2013/0097663 A1  Apr. 18, 2013

Related U.S. Application Data

(60) Provisional application No. 61/546,235, filed on Oct. 12, 2011.

(51) Int. Cl.
*G06F 21/60* (2013.01)
*G06F 21/51* (2013.01)
(Continued)

(52) U.S. Cl.
CPC .............. *G06F 21/51* (2013.01); *G06F 21/74* (2013.01); *G06F 2221/2105* (2013.01); *G06F 2221/2113* (2013.01)

(58) Field of Classification Search
CPC ........ G06F 21/60; G06F 21/606; G06F 21/00; G06F 2221/2107; G06F 21/602; G06F 21/55; G06F 21/6209; G06F 17/30026; G06F 17/30047; G06F 21/78; G06F 2211/007; G06F 9/445; H04L 63/0428; H04L 29/06
(Continued)

(56) References Cited

U.S. PATENT DOCUMENTS 6,990,198 B2 * 1/2006 Kim .................. H04L 1/14
370/479
7,367,057 B2 * 4/2008 Das et al. ............... 726/24
(Continued)

FOREIGN PATENT DOCUMENTS

| EP | 0 876 026 A2 | 11/1998 |
| WO | WO 2007/006014 A2 | 1/2007 |
| WO | WO 2009/018479 A1 | 2/2009 |

OTHER PUBLICATIONS

Gallagher et al. "A guide to understanding security modeling in trusted system", National Computer Security Center, National Security Agency, Oct. 1992, 122 pages.*
(Continued)

*Primary Examiner* — Tae Kim
*Assistant Examiner* — Shiuh-Huei Ku
(74) *Attorney, Agent, or Firm* — Daly, Crowley, Mofford & Durkee, LLP

(57) ABSTRACT

In one aspect, an integrated circuit (IC) includes a secure router configured as a trust anchor, a non-volatile random access memory (RAM) direct memory access (DMA) channel coupled to the secure router, a first DMA coupled to the secure router and configured to receive data with a first classification and a second DMA coupled to the secure router and configured to receive data with a second classification. The IC also includes a secure boot/key controller coupled to the secure router and configured as a trust anchor to boot the IC securely and a processor coupled to the secure router and configured to encrypt data, to store protocols, to
(Continued)

store instructions to detect malicious intrusions on the IC and to provide key management.

21 Claims, 4 Drawing Sheets

(51) Int. Cl.
G06F 21/74 (2013.01)
G06F 21/00 (2013.01)
G06F 21/55 (2013.01)
H04L 29/06 (2006.01)
H04L 9/16 (2006.01)

(58) Field of Classification Search
USPC .............................. 380/200, 277; 726/2, 26
See application file for complete search history.

(56) References Cited

U.S. PATENT DOCUMENTS

| | | | |
|---|---|---|---|
| 7,401,126 B2* | 7/2008 | Pekkala et al. ............... 709/217 |
| 2004/0022107 A1* | 2/2004 | Zaidi .................. G06F 15/7832 |
| | | | 365/202 |
| 2007/0110053 A1* | 5/2007 | Soni et al. .................... 370/389 |
| 2007/0294496 A1* | 12/2007 | Goss .................. G06F 12/1408 |
| | | | 711/163 |
| 2009/0100521 A1* | 4/2009 | Fu et al. .......................... 726/24 |
| 2011/0191599 A1* | 8/2011 | Chou et al. ................... 713/193 |
| 2012/0023562 A1* | 1/2012 | Harp ..................... H04L 63/102 |
| | | | 726/7 |

OTHER PUBLICATIONS

Gallagher "A Guide to Understanding Security Modeling in Trusted Systems", National Computer Security Center, National Security Agency, Oct. 1992, 122 Pages.*
PCT Invitation to Pay Additional Fees and Partial Search Report of the ISA; dated Jan. 23, 2013; for PCT Pat. App. No. PCT/US2012/059679; 82 pages.
Notification of Transmittal of the International Search Report, including the International Search Report & Written Opinion of the ISA; for International Appl. No. PCT/US2012/059679.
International Preliminary Report on Patentability of the ISA for PCT/US2012/059679 dated Oct. 11, 2012 1 page.
PCT Written Opinion of the ISA for PCT/US2012/059679 dated Oct. 11, 2012 12 pages.

* cited by examiner

INTEGRATED CIRCUIT FOR CYBER SECURITY PROCESSING

BACKGROUND

Over time more and more devices are connected through an Internet protocol (IP). Any device that is connected over IP runs the risk of being compromised by hostile entities and/or malicious code. The devices that can connect over IP include smart phones and mobile devices. Generally, for example, a user must choose to have a lightweight unsecure smart phone or have a heavily weighted device that consumes high power. Other devices connected over IP include medical monitoring equipment that provide status and control but are generally unencrypted and thus vulnerable to attack. For example, a medical device can be hacked and turned off potentially risking human life.

SUMMARY

In one aspect, an integrated circuit (IC) includes a secure router configured as a trust anchor, a non-volatile random access memory (RAM) direct memory access (DMA) channel coupled to the secure router, a first DMA coupled to the secure router and configured to receive data with a first classification and a second DMA coupled to the secure router and configured to receive data with a second classification. The IC also includes a secure boot/key controller coupled to the secure router and configured as a trust anchor to boot the IC securely and a processor coupled to the secure router and configured to encrypt data, to store protocols, to store instructions to detect malicious intrusions on the IC and to provide key management.

In another aspect, an integrated circuit (IC) includes a processor, a secure router coupled to the processor and includes a security policy, a memory, a secure boot/key controller coupled to the memory and the secure router and a non-transitory machine-readable medium that stores executable instructions to boot the IC. The instructions cause a machine to fetch application key stored in the memory, validate an image against the security policy, decrypt the image, transition the IC to a secure state and transition control of the IC to an application.

In a further aspect, an integrated circuit (IC), includes a processor, a secure router coupled to the processor and includes a security policy, a memory, a secure boot/key controller coupled to the memory and the secure router, a first direct memory access coupled to the secure router, a second direct memory access coupled to the router and a non-transitory machine-readable medium that stores executable instructions. The instructions cause a machine to receive data from the first direct memory access, validate the data against a security policy, process at the processor the data if the data is validated, validate post processing data against the security policy and provide the post processing data to a second direct memory access if the post processing data is validated.

DETAILED DESCRIPTION

Described herein is an integrated circuit (IC) (i.e., a chip) such as an application-specific integrated circuit (ASIC) or a processor chip that provides hack-proof security for embedded systems (e.g., military, civil, medical, automotive and so forth) while providing voice and data communications security for the global market. In one example, using the new National Security Agency (NSA) certification processes, fully exportable Suite B algorithms compliant to the NSA standards are embedded in the IC. The IC also includes a novel processing architecture and soft IP core. A complete red side processing element is also embedded in the IC for classic red/black functional partitioning. A boot ROM and an intrusion detection system enable the IC to be secure and "hack aware" by allowing the IC to detect and react to cyber attacks in real-time.

As used herein "red" data refers to data that is classified and must be protected from unauthorized individuals. "Black" data refers to data that is unclassified and does not necessarily need to be protected to the same degree as red data.

Figure 1:
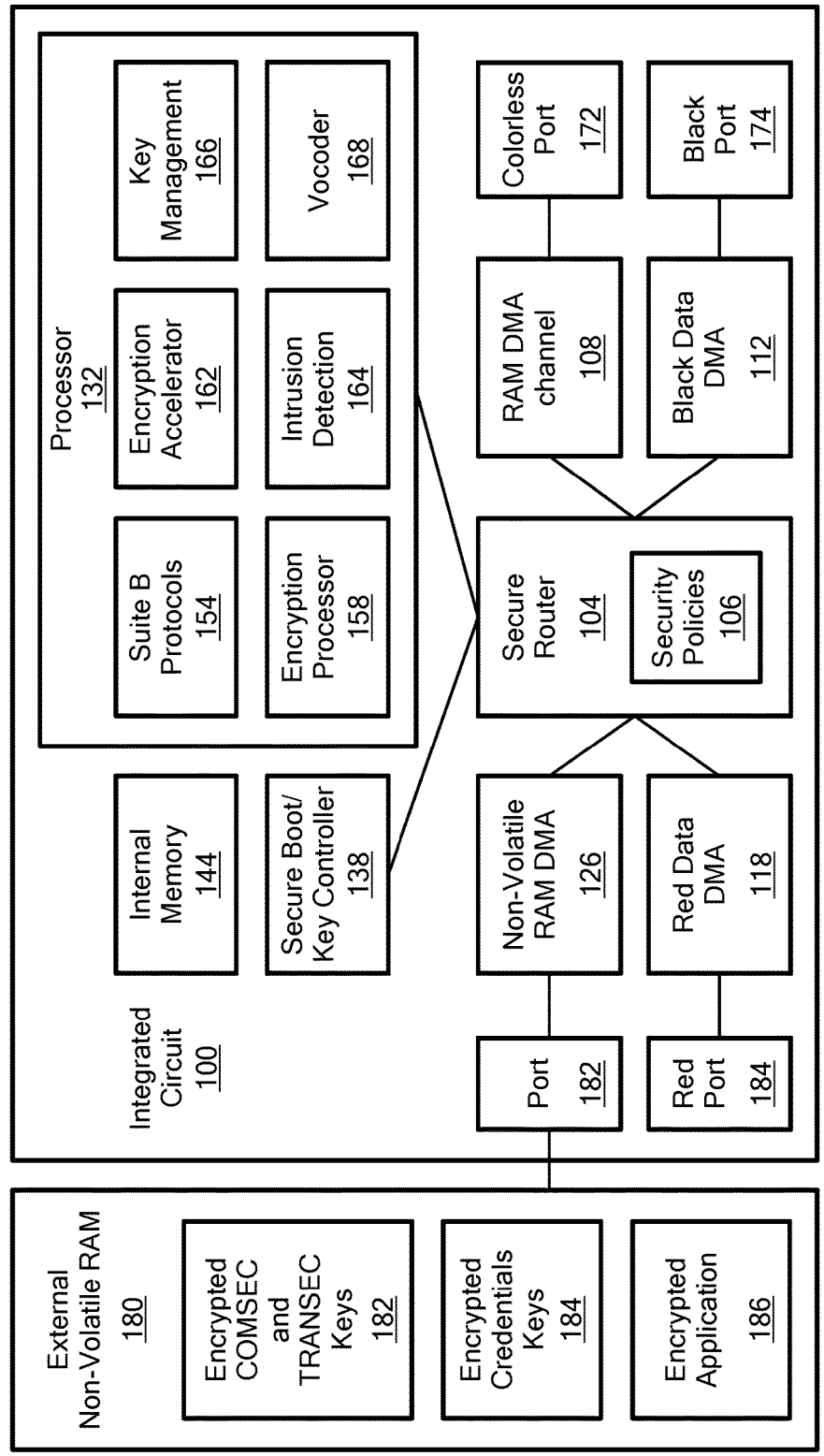
FIG. 1 is a block diagram of an example of an integrated circuit (IC) for cyber security processing.

Referring to FIG. 1, an IC 100 includes a secure router 104 governed by security policies 106 and coupled to a random access memory (RAM) direct memory access (DMA) channel 108 configured to receive and send data (red or black) from and to a colorless port 172. The IC 100 also includes a black data DMA channel 112 configured to receive and send black data from and to a black port 174, a red data DMA channel 118 configured to receive and send red data from and to a red port 184, a non-volatile RAM DMA 126 channel configured to save and receive black persistent data from a black port 182, a secure boot/key controller 138 and a processor 132. The IC 100 further includes a memory 144 coupled to the secure boot/key controller 138 and configured to store critical system keys and credentials. In one example, the memory 144 is a battery-backed internal storage. In one example, the security policies 106 may be configured by a user.

The processor 132 includes suite B protocols 154, an encryption processor 158, an encryption accelerator 162, an intrusion detection module 164, a key management module 166 and a voice encoder (vocoder) 168. Suite B protocols are NSA protocols that include the Advanced Encryption Standard (AES), cryptographic algorithms for key exchange, digital signatures, and hashing.

The secure router 104 and the secure boot/key controller 138 are each a hardware element that is referred to in the art as a trusted anchor (sometimes referred to herein as a trust anchor). The trusted anchor performs a function that is trusted. For example, the NSA has approved the trusted anchor to perform a particular function.

In one example, the IC may be configured to be coupled to an external non-volatile RAM 180. The external non-volatile RAM 180 includes encrypted communications security (COMSEC) and transmission security (TRANSEC) keys 192, encrypted credentials 194 (e.g., signatures, passwords and so forth) and encrypted applications 196 (e.g., used in secure boot, secure kernel, key management, Suite B algorithms and vocoders). The data on the external non-volatile RAM 180 can be loaded through the port 192 on to the IC 100 and stored decrypted in the internal memory 144. For example, these applications are loaded at the factory (i.e., before being deployed).

The external non-volatile RAM 180 may store any persistent data used by the IC 100. For example, security policies, software applications, encrypted keys and so forth may be stored at the external non-volatile RAM 180. In one example, data in the external non-volatile RAM 180 is encrypted. The internal memory 144 stores encryption keys for decrypting the contents of the external non-volatile RAM 180.

In this configuration, the processor 132 is physically isolated and any communication with the processor 132 is through the secure router 104 and/or through a secure kernel.

Figure 2:
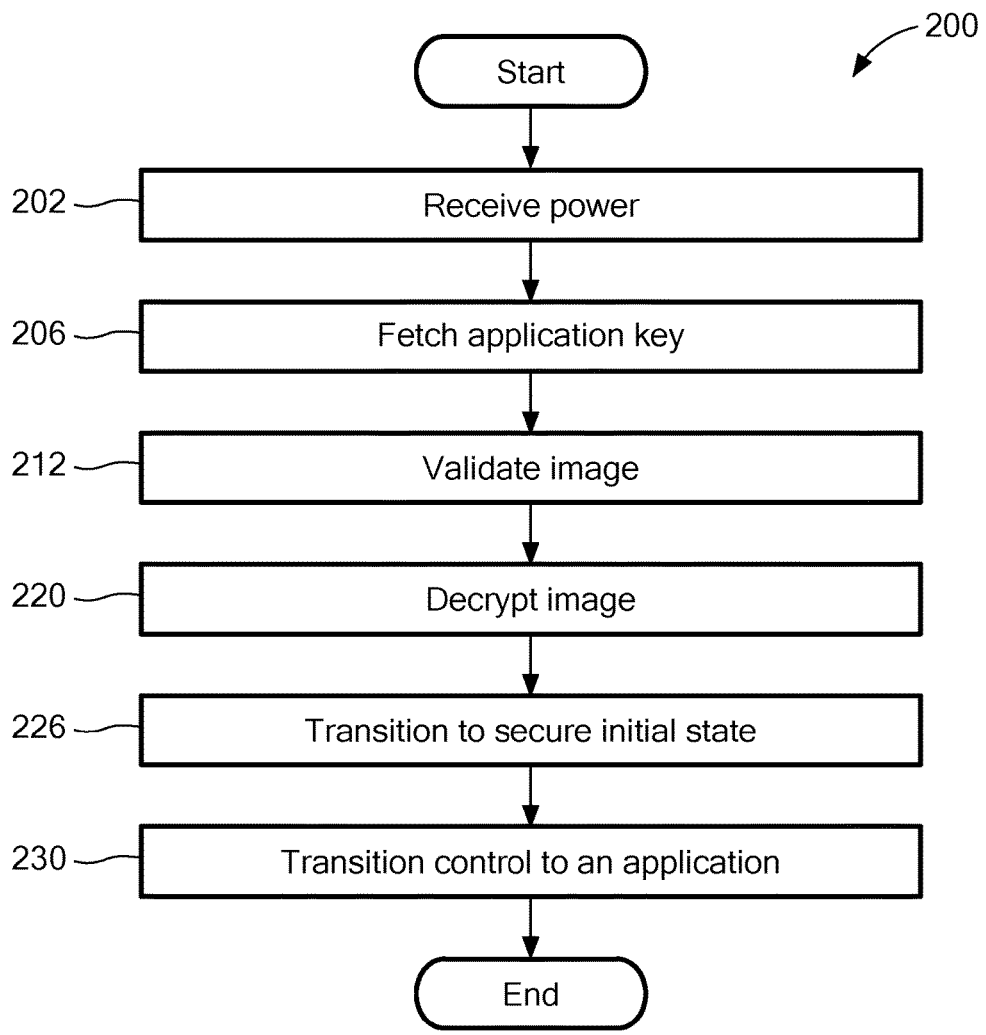
FIG. 2 is a flowchart of an example of a process to boot securely the IC of FIG. 1.

Referring to FIG. 2, an example of a process to boot securely is a process 200. The IC 100 includes a static built-in boot sequence that allows for protection of the programmable user application software. This boot process provides data integrity and authentication of a user's software image, as well as anti-tamper and anti-reverse engineering features through the use of built in decryption.

The IC 100 receives power (202) and process 200 fetches an application key (206). For example, the secure boot/key controller 138 retrieves the application key from the internal memory 144.

Process 200 validates image (212). For example, the secure boot/key controller 138 validates the image checking its integrity against credentials loaded into internal memory 144. In one example, the image includes the application software, Suite B protocol keys, application credentials, and the security policy 106 for the secure router 104. Process 200 decrypts the image (220). For example, the secure boot/key controller 138 decrypts the application image using built-in algorithms and keys from the internal memory 144. Once decrypted the secure boot/key controller 138 loads any decrypted algorithm software or application software image into the processor 132 and loads security policies into the secure router 104.

Process 200 transitions to a secure initial state (226). For example, once software is decrypted and validated for integrity by the secure boot/key controller 138, the IC 100 transitions to a secure initial state allowing data to flow in and out of ports 184, 172, and 174 along with execution to begin in the processor 132.

Process 200 transitions control to programmable application code (230). For example, the IC transitions control to the programmable application code in the processor 132.

Figure 3:
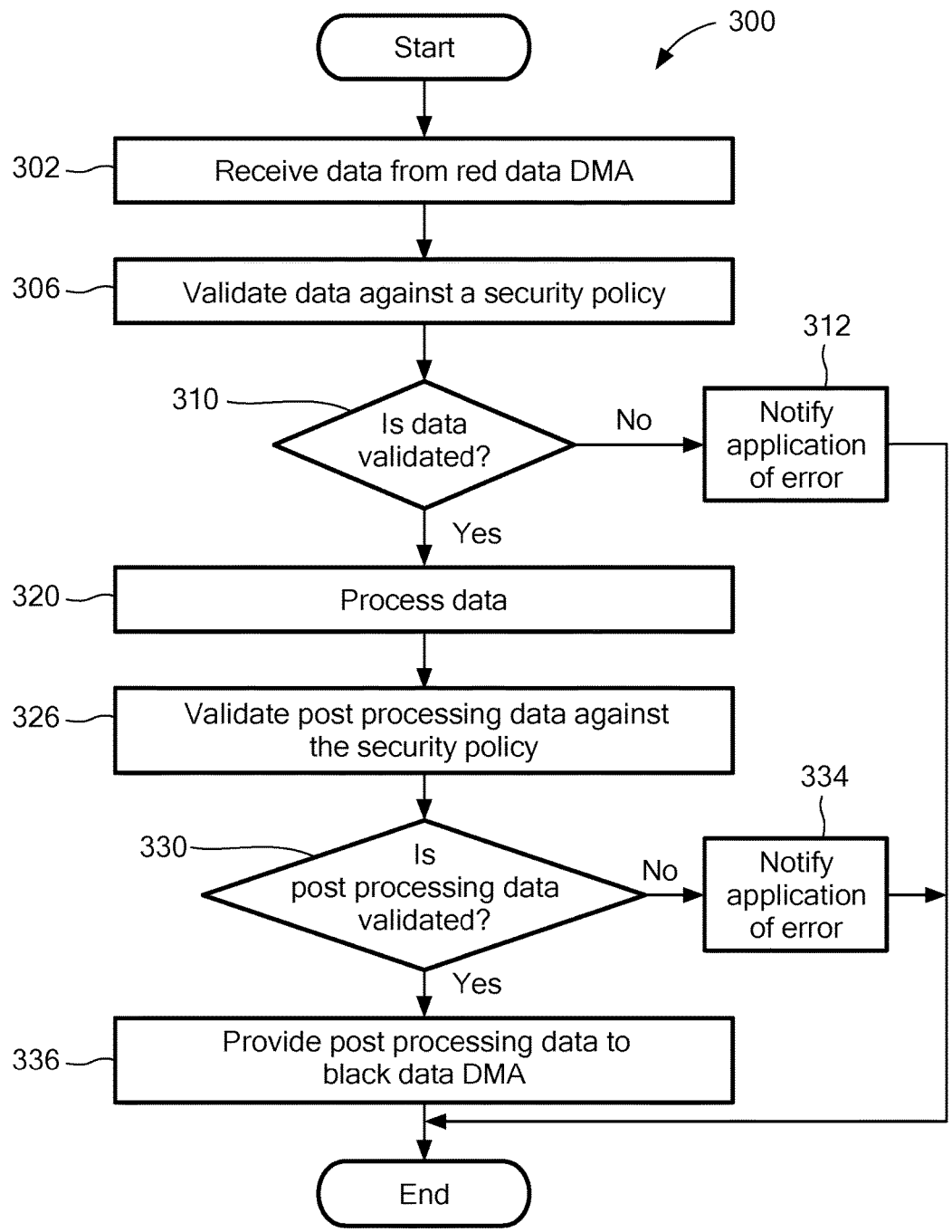
FIG. 3 is a flowchart of an example of a process to handle data from red to black data in the IC of FIG. 1.

Referring to FIG. 3, an example of a process to handle data with different security classifications is a process 300. For example, data flow processing within the IC 100 allows for a red or "high" side and a black or "low" side memory or peripheral devices to be attached. The IC 100 provides a bridge between the two sides of data and can be used for traditional red/black isolation and separation in communication equipment. For example, high and low sides of a cross domain guard or any other processing application where sensitive data processing needs to be isolated from non-sensitive data processing. While all combinations are possible with the IC 100, process 300 is an example of a typical red data to black data processing operation.

Process 300 receives data (302). For example, the IC 100 receives data provided at the port 184 from the red data DMA 118.

Process 300 validates the data against a security policy (306). For example, based on the security policy stored at the secure router 104, the data is validated against the security policy to determine if the data, for example, has the appropriate headers or specific fields within the data (e.g., source/destination checking, message content checking, hash validation, sequence numbers increasing, CRC checks and so forth).

Process 300 determines if the data is validated against the security policy (310). If the data is not validated, process 300 notifies an application of an error (312). For example, if the data is not validated against the security policy, the intrusion detection system 164 notifies the user application code of a violation.

If the data is validated against the security policy, process 300 processes the data (320). For example, the secure router 104 provides the data to the processor 132 for high speed processing. In one example, the processing is defined by the user. In one particular example, the processing could include encryption/decryption, signal processing, cross domain guard, and so forth.

Process 300 validates the post processing data against the security policy (326). For example, once the data is processed, the data is transitioned back to the secure router 104 where it is checked against the security policy.

Process 300 determines if the post processing data is validated (330). If the post-processing data is not validated, process 300 notifies the application of an error (334). For example, if the post processing data fails validation against the security policy, the intrusion detection system 164 notifies the user application code of a violation.

If the post processing data is validated against the security policy, process 300 provides the data to the black data DMA 112 (336). For example, the data is provided to the black data DMA 112 for transmission out the port 174.

Figure 4:
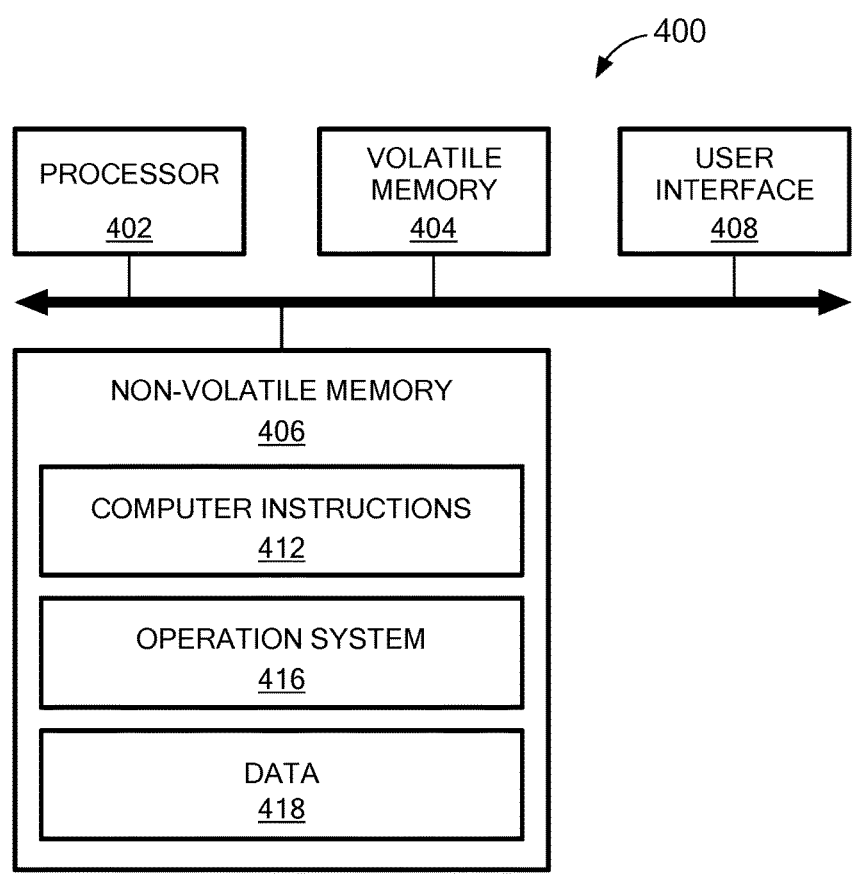
FIG. 4 is a computer on which the processes of FIGS. 2 and 3 may be implemented.

Referring to FIG. 4, in one example, a computer 400 includes a processor 402, a volatile memory 404, a non-volatile memory 406 (e.g., hard disk) and the user interface (UI) 408 (e.g., a graphical user interface, a mouse, a keyboard, a display, touch screen and so forth). The non-volatile memory 406 stores computer instructions 412, an operating system 416 and data 418. In one example, the computer instructions 412 are executed by the processor 402 out of volatile memory 404 to perform all or part of the processes described herein (e.g., processes 200 and 300).

The processes described herein (e.g., processes 200 and 300) are not limited to use with the hardware and software of FIG. 4; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 and 300 are not limited to the specific processing order of FIGS. 2 and 3, respectively. Rather, any of the processing blocks of FIGS. 2 and 3 may be re-ordered, combined or removed, performed in parallel or in serial, as necessary, to achieve the results set forth above.

While the examples herein referred to processing red and black data, the techniques herein may be used between any two classes of data. For example, one class of data could be top secret data and another class of data could be merely secret data.

The processing blocks (for example, in the processes 200 and 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, programmable logic devices or logic gates.

Elements of different embodiments described herein may be combined to form other embodiments not specifically set forth above. Other embodiments not specifically described herein are also within the scope of the following claims.

What is claimed is:

1. An integrated circuit (IC) comprising:
   a secure router configured as a trust anchor configured to perform a function that is trusted;
   a non-volatile random access memory (RAM) direct memory access (DMA) channel coupled to the secure router;
   a first DMA coupled to the secure router and configured to receive data with a first classification;
   a second DMA coupled to the secure router and configured to receive data with a second classification, the data with the first classification requires more secure protection than the data with the second classification;
   a secure boot/key controller coupled to the secure router and configured as a trust anchor to boot the IC securely; and
   a processor coupled to the secure router and configured to encrypt data, to store protocols, to store instructions to detect malicious intrusions on the IC and to provide key management.

2. The IC of claim 1 wherein the processor comprises an encryption accelerator and a voice encoder.

3. The IC of claim 1 wherein the processor stores suite B protocols.

4. The IC of claim 1 wherein the secure router comprises a security policy.

5. The IC of claim 4 wherein the security policy is configurable by a user.

6. The IC of claim 1, further comprising a memory coupled to the secure boot/key controller and configured to store keys.

7. The IC of claim 6 wherein the memory is battery-backed memory.

8. The IC of claim 1 wherein the data with the first classification is classified data and the data with the second classification is unclassified data.

9. An integrated circuit (IC) comprising:
   a processor;
   a secure router coupled to the processor and comprising a security policy;
   a memory;
   a secure boot/key controller coupled to the memory and the secure router;
   a first port configured to receive data with a first classification;
   a second port configured to receive data with a second classification, the data with the first classification requires more secure protection than the data with the second classification;
   a third port configured to receive data with the first classification and to receive data from the second classification; and
   a non-transitory machine-readable medium that stores executable instructions to boot the IC, the instructions causing a machine to:
      fetch an application key stored in the memory, the application key being associated with an application;
      validate an image against the security policy;
      decrypt the image using built-in algorithms and keys stored in the memory;
      transition the IC to a secure state if the image is validated and decrypted, the secure state allowing data to flow in and out of the first, second and third ports and allowing execution of the processor; and
      transition control of the IC to the application.

10. The IC of claim 9 wherein the secure router and the secure boot/key controller are trust anchors each configured to perform a function that is trusted.

11. The IC of claim 10 wherein the processor comprises an encryption accelerator.

12. The IC of claim 11 wherein the processor stores suite B protocols.

13. The IC of claim 12 wherein the processor comprises a voice encoder.

14. An integrated circuit (IC), comprising:
   a first port coupled to a first direct memory access (DMA) and configured to receive data with a first classification from outside the IC;
   a second port coupled to the second DMA and configured to receive data with a second classification from outside the IC, the data with the first classification requires more secure protection than the data with the second classification;

a processor;

a secure router coupled to the processor and comprising a security policy;

a memory;

a secure boot/key controller coupled to the memory and the secure router;

the first DMA coupled to the secure router and configured to receive data with the first classification;

the second DMA coupled to the secure router and configured to receive data with the second classification; and a non-transitory machine-readable medium that stores executable instructions, the instructions causing a machine to:

receive data from the first DMA provided by the first port;

validate the data against a security policy stored at the secure router;

process at the processor the data provided by the secure router if the data is validated;

validate post processing data against the security policy at the secure router after processing of the data by the processor; and provide the post processing data to the second DMA for transmission out of the second port if the post processing data is validated.

15. The IC of claim 14 wherein the secure router and the secure boot/key controller are trust anchors each configured to perform a function that is trusted.

16. The IC of claim 15 wherein the processor comprises an encryption accelerator and a voice encoder.

17. The IC of claim 16 wherein the processor stores suite B protocols.

18. The IC of claim 17 wherein the processor comprises a voice encoder.

19. The IC of claim 1 wherein the trust anchor is trusted by the National Security Agency (NSA).

20. The IC of claim 10 wherein at least one of the trust anchors is trusted by the National Security Agency (NSA).

21. The IC of claim 15 wherein at least one of the trust anchors is trusted by the National Security Agency (NSA).

* * * * *